(12) United States Patent
Czachor et al.

(10) Patent No.: US 6,612,809 B2
(45) Date of Patent: Sep. 2, 2003

(54) THERMALLY COMPLIANT DISCOURAGER SEAL

(75) Inventors: Robert Paul Czachor, Cincinnati, OH (US); Tod Kenneth Bosel, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/996,268

(22) Filed: Nov. 28, 2001

(65) Prior Publication Data

US 2003/0099542 A1 May 29, 2003

(51) Int. Cl.$^7$ ................................ F01D 9/04
(52) U.S. Cl. .................. 415/189; 415/191; 415/209.2; 277/236
(58) Field of Search ............... 415/189, 174.2, 415/190, 209.2, 209.3, 209.4, 191; 277/236, 637, 579, 580, 643, 189, 173, 192, 194, 56, 27, 30, 53

(56) References Cited

U.S. PATENT DOCUMENTS

| | | | |
|---|---|---|---|
| 3,720,419 A | * 3/1973 | Adelizzi | 277/53 |
| 4,103,905 A | 8/1978 | Desmond et al. | 277/56 |
| 4,285,633 A | * 8/1981 | Jones | 415/191 |
| 4,304,522 A | * 12/1981 | Newland | 415/135 |
| 4,309,145 A | * 1/1982 | Viola | 415/170 |
| 4,311,313 A | 1/1982 | Vedova et al. | 277/27 |
| 4,548,427 A | * 10/1985 | Press et al. | 285/55 |
| 4,662,658 A | * 5/1987 | Holowach et al. | 285/177 |
| 4,979,755 A | * 12/1990 | Legreton | 277/1 |
| 5,096,376 A | 3/1992 | Maon et al. | 415/173.5 |
| 5,218,816 A | 6/1993 | Plemmons et al. | 60/39.75 |
| 5,316,405 A | 5/1994 | Atanasoski et al. | 403/28 |
| 5,361,577 A | * 11/1994 | Cromer | 60/39.32 |
| 5,513,955 A | * 5/1996 | Barcza | 416/95 |
| 5,709,530 A | * 1/1998 | Cahill et al. | 415/170.1 |
| 5,749,218 A | * 5/1998 | Cromer et al. | 60/39.31 |
| 5,868,398 A | * 2/1999 | Maier et al. | 277/643 |
| 5,971,703 A | * 10/1999 | Bouchard | 415/135 |
| 6,076,835 A | * 6/2000 | Ress et al. | 277/637 |

* cited by examiner

*Primary Examiner*—Edward K. Look
*Assistant Examiner*—James M McAleenan
(74) *Attorney, Agent, or Firm*—Pierce Atwood; Nathan D. Herkamp

(57) ABSTRACT

The present invention provides a seal for a gas turbine engine, comprising an annular ring with an L-shaped cross-section having a radially extending leg and an axially extending leg. A plurality of corrugations are formed in the axial leg so as to make it compliant in the circumferential direction.

16 Claims, 2 Drawing Sheets

THERMALLY COMPLIANT DISCOURAGER SEAL

BACKGROUND OF THE INVENTION

This invention relates generally to gas turbine engines and more particularly to stationary seals used in gas turbine engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan.

An engine has a primary flowpath through the compressor, combustor, and turbine for hot combustion gases. There are also secondary flowpaths for various purposes, for example cooling flows, sump pressurization, etc., as well as various enclosed cavities which are isolated from the primary flowpath of the engine.

It is common in the prior art to require discourager seals at various locations within the hot section of a gas turbine engine and adjacent to the primary flowpath for purposes of preventing hot gas ingestion into the engine's cavities. A typical discourager seal has an L-shaped cross-section including a radial leg or flange for attachment of the seal, for example in a bolted joint between two stationary structures, and an axially extending leg adjacent to the flowpath. The nature of the discourager seal function is such that the axial leg near the flowpath will operate at very high temperature, while the flanged portion is typically much cooler. The resulting thermal stresses in the axial leg, which is typically a simple cylindrical flange, can be destructive and lead to buckling or low-cycle fatigue cracking of the axial leg of the seal.

Accordingly, there is a need for a discourager seal having improved durability when exposed to high temperatures.

BRIEF SUMMARY OF THE INVENTION

The above-mentioned need is met by the present invention, which provides a seal for a gas turbine engine, comprising an annular ring with an L-shaped cross-section having a radially extending leg and an axially extending leg. A plurality of corrugations are formed in the axial leg so as to make it compliant in the circumferential direction.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
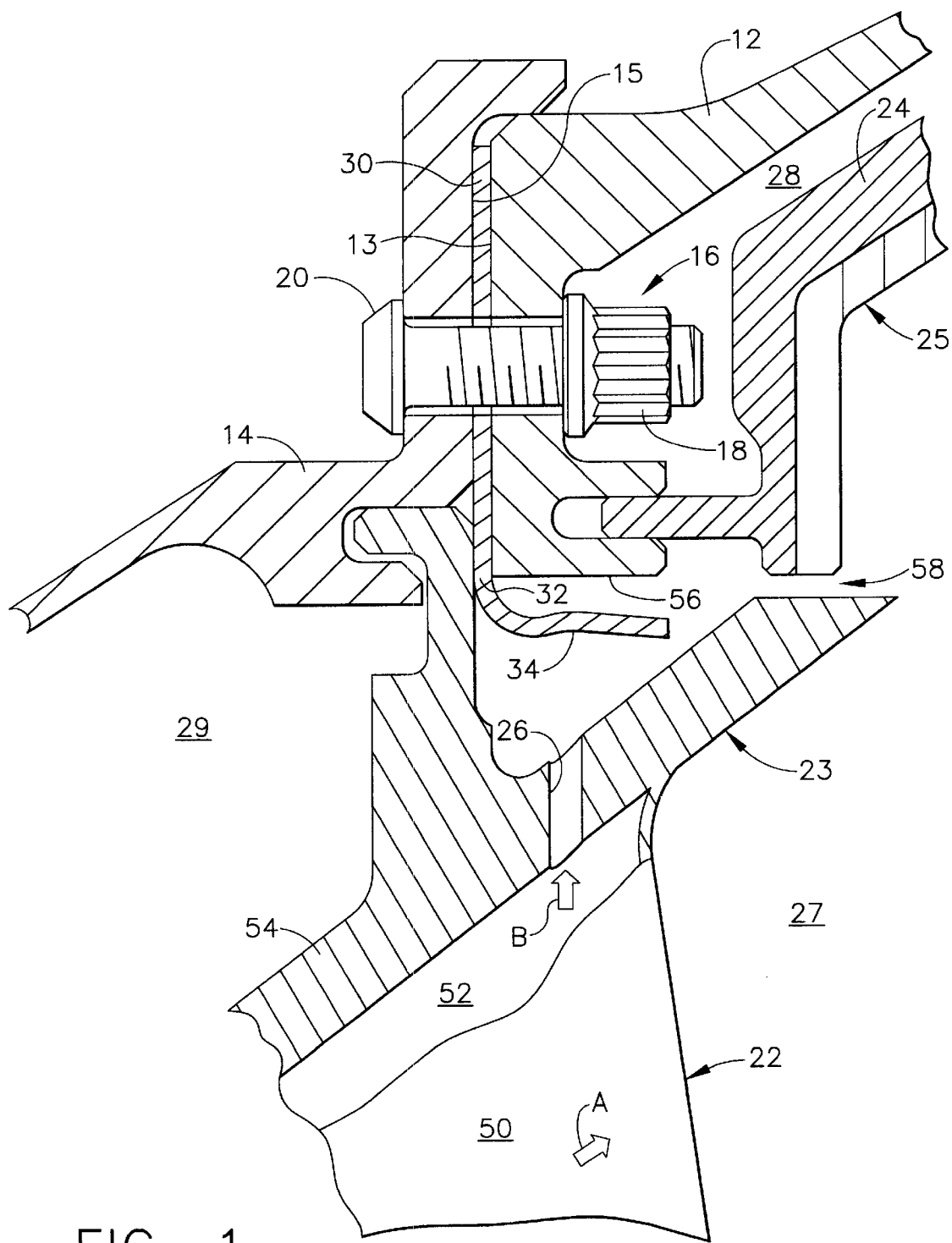
FIG. 1 is a fragmentary cross-sectional view of a portion of a gas turbine engine.

Referring to the drawings wherein identical reference numerals denote the same elements throughout the various views, FIG. 1 illustrates a fragmentary cross-section of a portion of a gas turbine engine. The particular components illustrated are for example purposes only, the present invention being equally applicable to other components of similar configuration. FIG. 1 illustrates a portion of the forward end of a low pressure turbine casing 12, which is a generally annular structure surrounding the longitudinal axis (not shown) of the engine. An annular turbine center frame 14 abuts the casing 12 and is secured thereto by fastening means 16. The casing 12 and the turbine center frame 14 each have a generally radially extending joint face, labeled 13 and 15 respectively in FIG. 1. The casing 12 has an annular flange 56 disposed at a radially inner portion thereof. In the illustrated example the fastening means 16 takes the form of a threaded nut 18 and bolt 20. Any known type of fastening means capable of securing the two components together could be used, for example a rivet (not shown) could be substituted for the nut 18 and bolt 20, or alternatively, one of the casing 12 or the frame 14 could have an internally threaded hole into which a bolt 20 is installed.

A generally annular turbine nozzle 22 is suspended from the turbine center frame 14 and has an arcuate nozzle band 54 with a surface 23 which forms a portion of the boundary of a hot gas flowpath 27. A hollow cooled nozzle airfoil 50 (shown in partial section in FIG. 1) extends radially inward from the nozzle band 54. A generally annular turbine shroud 24 is disposed radially inwardly of the casing 12 and has a surface 25 which forms a portion of the boundary of the hot gas flowpath 27. An annular cavity 28 is defined in the space between the casing 12 and the turbine shroud 24, and annular cavity 29 is defined in the space between the turbine center frame 14 and the turbine nozzle 22. The airfoil 50 has an interior cavity 52 which receives a flow of cooling air from the cavity 29, for example through inlet holes (not shown). After cooling the interior of the airfoil 50, the cooing air exits the airfoil 50 through an exit hole 26. A circumferential gap 58 exists between the turbine nozzle 22 and the turbine shroud 24. An annular discourager seal 30 is disposed in the joint between the turbine center frame 14 and the casing 12. The discourager.seal 30 is a generally circular ring which has a generally L-shaped cross-section. The discourager seal 30 has a circumferential flange which defines a radially extending leg 32 and another circumferential flange which defines an axially extending leg 34.

Figure 2:
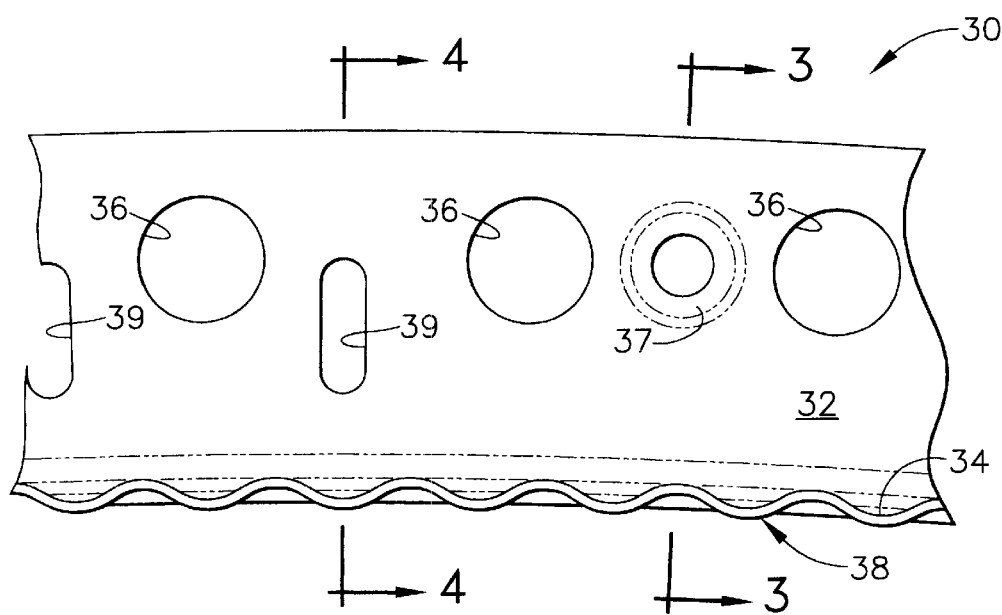
FIG. 2 is an aft-looking-forward view of a portion of a discourager seal constructed in accordance with the present invention.
Figure 3:
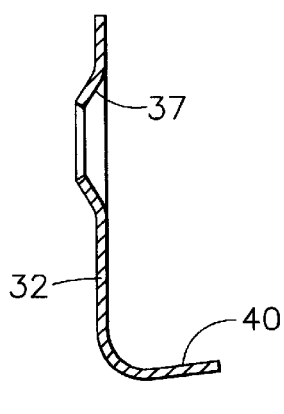
FIG. 3 is a cross-sectional view taken along lines 3—3 of FIG. 2.
Figure 4:
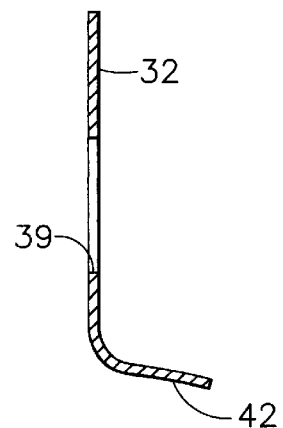
FIG. 4 is a cross-sectional view taken along lines 4—4 of FIG. 3.

Referring now to FIGS. 2, 3 and 4, the discourager seal 30 is shown in more detail. The axial leg 34 of the seal 30 has an annular array of corrugations 38 formed therein. The corrugations 38 comprise alternate undulations 40 and 42 which are concave and convex respectively, relative to a radially outward direction. The corrugations 38 give the axial leg 34 compliance in a circumferential direction so that it may shrink and expand during temperature variations without buckling or cracking. The number and dimensions of the corrugations 38 may be varied to suit a particular application.

The radial leg 32 has a plurality of holes 36 formed therethrough which serve to admit fastening means 16 when the radial leg 32 is disposed between joint faces 13 and 15. Additional holes 37 may be formed in the radial leg which include a countersink (see FIG. 3) to as to accept the head of a fastener (not shown). The discourager seal 30 may be secured to threaded holes (not shown) in the turbine center frame 14 using fasteners placed through the countersunk holes 37. This allows the discourager seal 30 to be attached to the turbine center frame 14 without installing the turbine casing 12, and thus to serve as a retainer to keep the turbine nozzle segments 22 in place during assembly of the engine. The radial leg 32 may also include one or more slots 39, which may serve the purpose of admitting and metering a flow of cooling air through the radial leg 32 from cavity 29 through a passage in the turbine center frame 14 (not shown) to a passage in the turbine casing 12 (also not shown) and subsequently to the cavity 28. In the illustrated example the slots 39 are elongated in a radial direction. The discourager seal 30 is manufactured by a known method and may be made from any material capable of withstanding the operating temperatures in the engine, for example a nickel- or cobalt-based alloy. One suitable material is a high-temperature cobalt alloy such as that identified by SAE specification AMS 5608.

In operation, combustion gases flow through the hot gas flowpath 27 generally in the direction of the arrow labeled A (FIG. 1). A separate flow of cooling air is provided to cavity 29. The cooling air flows into the interior cavity 52 of the airfoil 50, picking up heat therein, and subsequently exits the airfoil 50 through the exit hole 26, as shown by the arrow labeled B. This spent cooling air flows radially outward through the exit hole 26. Left unchecked, this flow tends to overheat the flange 56 of the casing 12. The axial leg 34 of the discourager seal 30 provides an impediment to the flow from the exit hole 26, which tends to turn the spent cooling flow radially inward away from the flange 56, and direct it through the gap 58 and back into the flowpath 27. The corrugations 38 formed in the axial leg 34 of the discourager seal 30 of the present invention make the seal 30 very compliant in the circumferential direction. In operation, when the temperature of the axial leg 34 is much higher than that of the remainder of the seal 30, the corrugations 38 allow differential circumferential growth of the axial and radial legs of the seal 30 while maintaining low stress levels. The seal 30 is therefore free of the destructive thermal stresses of prior art designs and will be more durable in service.

The foregoing has described a seal for a gas turbine engine, comprising an annular ring with an L-shaped cross-section having a radially extending leg and an axially extending leg. A plurality of corrugations are formed in the axial leg so as to make it compliant in the circumferential direction. While specific embodiments of the present invention have been described, it will be apparent to those skilled in the art that various modifications thereto can be made without departing from the spirit and scope of the invention as defined in the appended claims.

What is claimed is:

1. A seal for a gas turbine engine, comprising:
   a circumferentially extending ring, said ring having a radially extending leg and an axially extending leg,
   said axially extending leg comprising a plurality of corrugations.

2. The seal of claim 1, wherein said corrugations comprise an annular array of alternating convex and concave undulations formed in said axially extending leg.

3. The seal of claim 1, wherein said seal is formed from a metal alloy.

4. The seal of claim 1 further comprising a plurality of holes formed through said radially extending leg.

5. The seal of claim 1 further comprising a plurality of elongated slots formed through said radially extending leg.

6. The seal of claim 1 further comprising a plurality of countersunk holes formed through said radially extending leg.

7. A joint assembly for a gas turbine engine, comprising:
   a first generally annular member having a first radially extending joint face,
   a second generally annular member having a second radially extending joint face; and
   an annular seal disposed between said first and second annular members, said seal comprising: a radially extending leg connected to an axially extending leg, wherein said radially extending leg is disposed between said first joint face and said second joint face, wherein said axially extending leg is corrugated in a circumferential direction.

8. The joint assembly of claim 7, wherein said seal is formed from a metal alloy.

9. The joint assembly of claim 7 further comprising a plurality of holes formed through said radially extending leg.

10. The joint assembly of claim 7 further comprising a plurality of elongated slots formed through said radially extending leg.

11. The joint assembly of claim 7 further comprising a plurality of countersunk holes formed through said radially extending leg of said discourager seal.

12. A joint assembly for a gas turbine engine, comprising:
   a generally annular turbine frame having a first radially extending joint face;
   a generally annular turbine casing disposed axially rearward of said turbine frame and having a second radially extending joint face;
   an annular turbine nozzle disposed radially inward of said turbine frame, said turbine nozzle comprising a hollow airfoil and an arcuate band, said band having an exit hole formed therein;
   an annular turbine shroud having a surface defining a gas flowpath, said turbine shroud disposed radially inward of said turbine casing, such that
   an annular cavity is defined between said turbine casing and said turbine shroud, and such that a circumferentially extending gap is defined between said turbine shroud and said turbine nozzle, said gap being in fluid communication with said flowpath and said annular cavity; and
   an annular discourager seal disposed between said turbine frame and said turbine casing, said discourager seal comprising a radially extending leg connected to an axially extending leg, wherein said radially extending leg is disposed between said first joint face and said second joint face, and said axially extending leg is disposed so as to redirect a fluid flow from said exit hole, and wherein said axially extending leg comprises an annular array of corrugations.

13. The joint assembly of claim 12, wherein said discourager seal is formed from a metal alloy.

14. The joint assembly of claim 12 further comprising a plurality of holes formed through said radially extending leg of said discourager seal.

15. The joint assembly of claim 12 further comprising a plurality of elongated slots formed through said radially extending leg of said discourager seal.

16. The joint assembly of claim 12 further comprising a plurality of countersunk holes formed through said radially extending leg of said discourager seal.

* * * * *